US012708946B2

(12) United States Patent
Passini et al.

(10) Patent No.: US 12,708,946 B2
(45) Date of Patent: Aug. 18, 2026

(54) ADDITIVELY MANUFACTURED GEOMETRY OPTIMIZED DRILLING JIGS AND METHODS OF MAKING AND USING THE SAME

(71) Applicant: EMBRAER S.A., São José dos Campos—SP (BR)

(72) Inventors: Adriano Passini, São José dos Campos—SP (BR); Leandro Oliveira Renó, São José dos Campos—SP (BR); Marcio Fernando Cruz, São José dos Campos—SP (BR)

(73) Assignee: EMBRAER S.A., São José Dos Campos—SP (BR)

( * ) Notice: Subject to any disclaimer, the term of this patent is extended or adjusted under 35 U.S.C. 154(b) by 603 days.

(21) Appl. No.: 18/297,837

(22) Filed: Apr. 10, 2023

(65) Prior Publication Data

US 2024/0335890 A1 Oct. 10, 2024

(51) Int. Cl.
*B23B 49/02* (2006.01)
*B33Y 10/00* (2015.01)
*B33Y 80/00* (2015.01)

(52) U.S. Cl.
CPC ............... *B23B 49/02* (2013.01); *B33Y 10/00* (2014.12); *B33Y 80/00* (2014.12)

(58) Field of Classification Search
CPC .. B23B 49/02; Y10T 408/568; Y10T 408/569
See application file for complete search history.

(56) References Cited

U.S. PATENT DOCUMENTS 2,475,263 A * 7/1949 Staggs .................... B23B 47/28 408/104
2,915,926 A * 12/1959 Woerner ............... B23B 49/023 408/115 B
3,981,604 A * 9/1976 Cenis .................... B23B 49/023 408/241 B
5,375,949 A * 12/1994 McHenry, Jr. ............ B26F 1/26 408/1 R (Continued)

FOREIGN PATENT DOCUMENTS

CA 2191255 A1 * 5/1998
DE 202007015134 U1 * 3/2009 ........... B23B 47/281

(Continued)

OTHER PUBLICATIONS

English translation of De 20_2007_015_134_U1, Dec. 9, 2025 (Year: 2025).*

*Primary Examiner* — Eric A. Gates
(74) *Attorney, Agent, or Firm* — NIXON & VANDERHYE P.C.

(57) ABSTRACT

Drilling jigs are provided which include a one-piece jig body (preferably additively manufactured from laser-sintered metallic (e.g., aluminum alloy) powders) having at least one set of cylindrical sockets that are spatially separated from one another, and a web member joining the at least one set of sockets. Cylindrical bushings may thus be positioned within each of the cylindrical sockets so as to define respective cylindrical guideways for a drill bit. According to certain embodiments, the web member may be planar and oriented parallel to a substantially longitudinal bisecting plane of the cylindrical sockets.

18 Claims, 6 Drawing Sheets

(56) References Cited

U.S. PATENT DOCUMENTS

| | | | | |
|---|---|---|---|---|
| 8,668,410 | B1 * | 3/2014 | Arana | B23B 49/02 408/97 |
| 8,782,870 | B2 * | 7/2014 | Link | B23B 47/281 408/72 B |
| 9,108,250 | B1 * | 8/2015 | Bui | B23B 47/28 |
| 9,388,078 | B2 | 7/2016 | Rael | |
| 10,065,240 | B2 | 9/2018 | Chen | |
| 10,350,684 | B2 | 7/2019 | Bunker | |
| 10,392,131 | B2 | 8/2019 | Deck et al. | |
| 10,589,878 | B2 | 3/2020 | Veto et al. | |
| 11,542,041 | B2 | 1/2023 | Aston et al. | |

FOREIGN PATENT DOCUMENTS

| | | | | |
|---|---|---|---|---|
| EP | 2121225 | B1 * | 9/2011 | B21J 15/142 |
| GB | 698643 | A * | 10/1953 | B23B 15/142 |
| KR | 20050010196 | A * | 1/2005 | |

* cited by examiner

ADDITIVELY MANUFACTURED GEOMETRY OPTIMIZED DRILLING JIGS AND METHODS OF MAKING AND USING THE SAME

FIELD

The embodiments disclosed herein relate generally to drilling jigs that are especially useful for ensuring the accurate drilling of component structures employed in the aerospace industry.

BACKGROUND

Conventional aluminum drilling jigs are designed and manufactured by a milling process wherein a raw material, such as aluminum plate, is machined and drilled to obtain the jig. For example, the current procedure for developing conventional aluminum drilling jigs comprises a design for a machining method whereby vectorized holes are accurately drilled to specific diameters and positions into a wrought aluminum plate that is also machined to a specified shape and thickness so as to conform to various specific geometries of the component structure in which holes are to be drilled using the jig. These jigs are used to drill apertures in packages of aircraft parts to be later mechanically joined by rivets, bolts, or other types of fasteners.

While some pockets can be machined into these conventional aluminum drilling jigs to reduce their weight, such a technique comes with a penalty of increased manufacturing time and cost. It is worth noting also that thermal expansion and structural analysis are not required for aluminum drilling jigs as their primary function is to guide the drill bit while drilling through the aircraft parts package.

Despite the conventional practice of employing machined aluminum plate being robust and having high dimensional accuracy, the aerospace industry faces challenges to find a more efficient solutions so as to reduce the cost, manufacturing time and jig weight. It is towards providing solutions to such challenges that the embodiments disclosed herein are directed.

SUMMARY

Generally, the embodiments disclosed herein are directed toward drilling jigs that are usefully employed so as to accurately position and guide drill bits when drilling apertures into a workpiece (e.g., when drilling apertures into overlapping parts that are subsequently to be joined together via rivets, bolts, or other types of fasteners positioned in the drilled apertures).

More specifically, the drilling jig according to the embodiments described herein will preferably include a one-piece jig body which having at least one set of cylindrical sockets that are spatially separated from one another, and a web member joining the at least one set of sockets. Cylindrical bushings may thus be positioned within each of the cylindrical sockets so as to define respective cylindrical guideways for a drill bit. According to certain embodiments, the web member may be planar and oriented parallel to a substantially longitudinal bisecting plane of the cylindrical sockets.

The jig body may further include a plurality of stand-off members that have sufficient axial length so as to establish a clearance gap between the bottom edge of the jig body and a surface of a workpiece to be drilled. Shavings from material being removed from the workpiece by the drill bit during the drilling operation are therefore allowed to be removed from the drilling location which may also be facilitated by the influence of a pressurized fluid (e.g., air) being directed to the drilling location. The stand-off members may either solid or solid or hollow structures.

In especially preferred embodiments, the jig body is a one-piece additively manufactured structural unit. Thus, the jig body may be formed of an additively laser sintered metallic powder, e.g., a powder comprised of aluminum alloy. The bushings may be formed of steel and adhesively secured to respective ones of the cylindrical sockets. Thus, the drilling jig may be fabricated by additively sintering layers of a metallic powder to form a one-piece jig body which includes at least one set of cylindrical sockets that are spatially separated from one another, and a web member joining the at least one set of sockets, and thereafter inserting cylindrical bushings defining respective cylindrical guideways into respective ones of the cylindrical sockets (which bushings may be adhesively secured to the sockets).

In use, the drilling jig according to the embodiments described herein may be positioned relative to a surface of a workpiece so as to align the cylindrical guideways of the bushings with respective locations on the surface of the workpiece where apertures are to be drilled, and thereafter a drill bit may be operated within the cylindrical guideways to drill the apertures through the workpiece.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
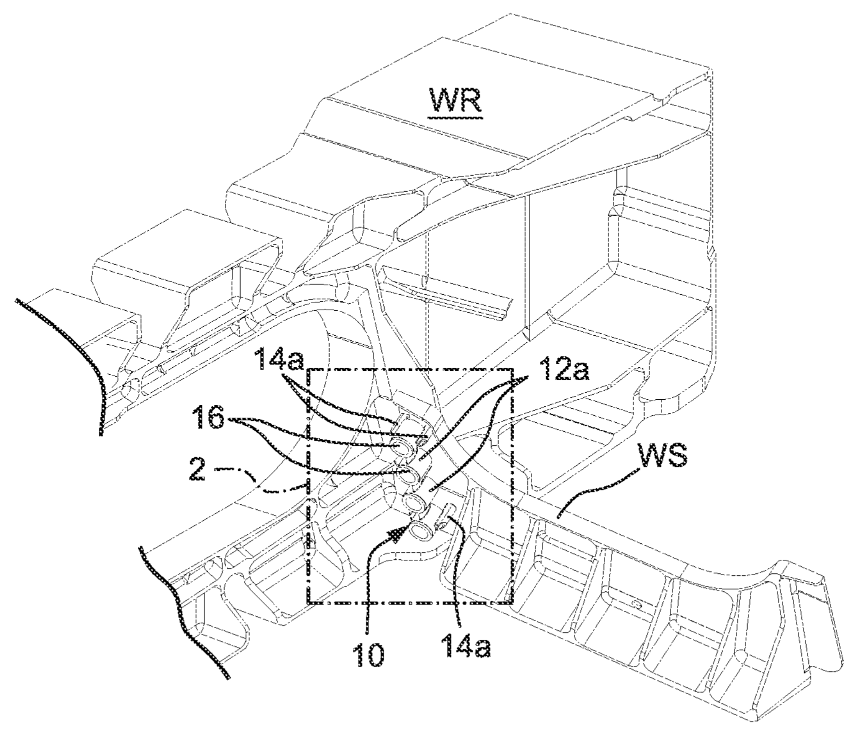
FIG. 1 is a perspective view of an exemplary drilling jig according to an embodiment of the invention depicted as being positioned so as to allow holes to be drilled into an overlapping aircraft wing spar and wing rib that will ultimately be joined to one another.
Figure 2:
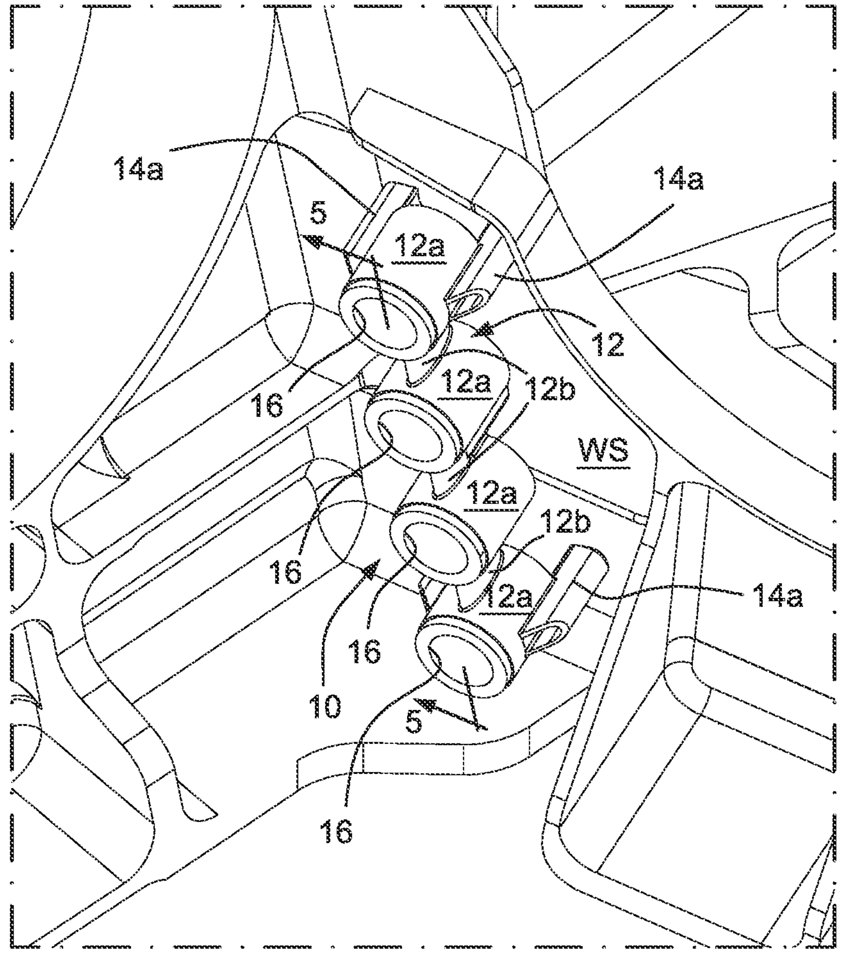
FIG. 2 is an enlarged perspective view of the drilling jig shown in FIG. 1.
Figures 3, 4:
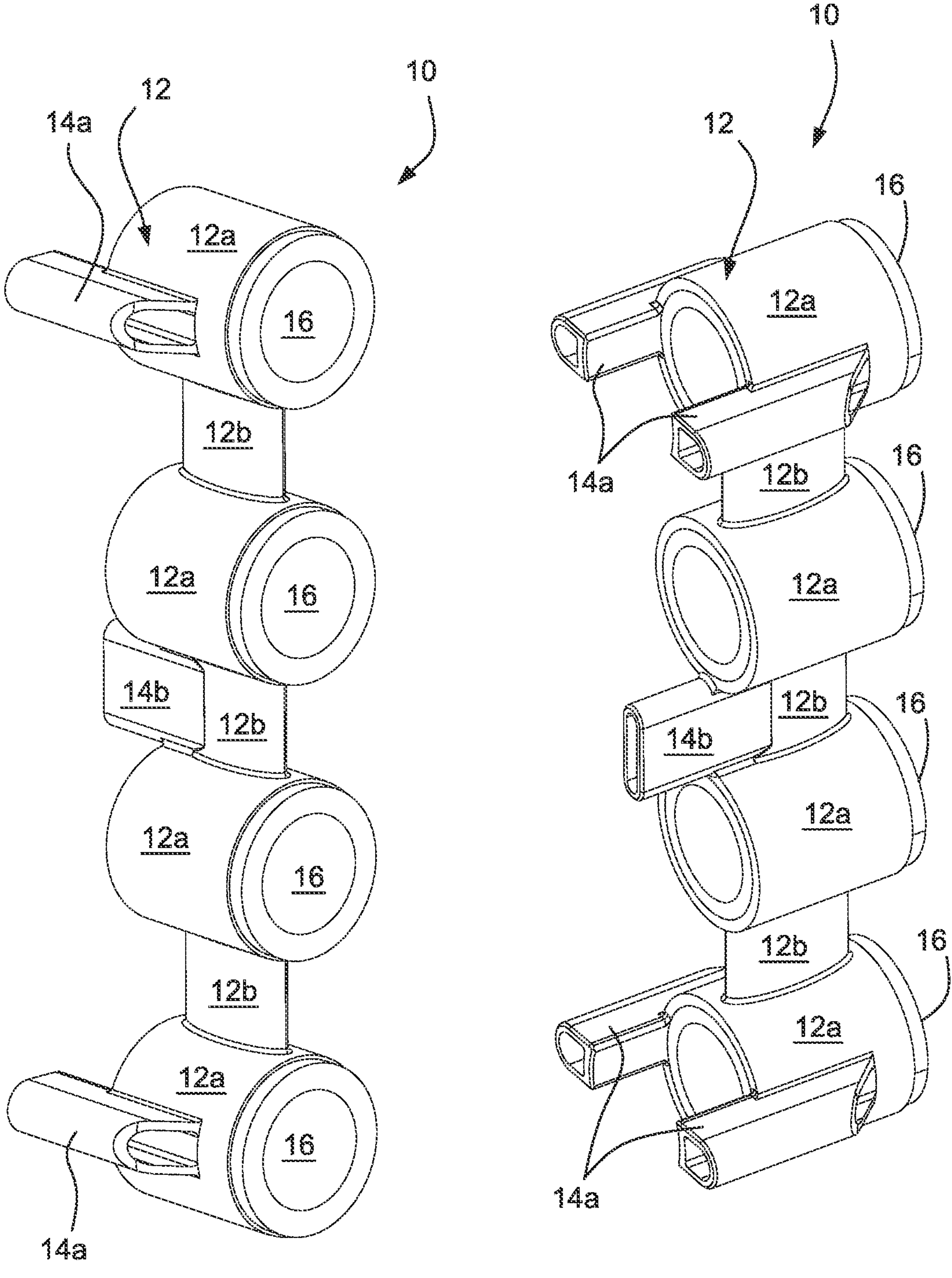
FIG. 3 is a top perspective view of the drilling jig shown in FIG. 1.
FIG. 4 is a bottom perspective view of the drilling jig shown in FIG. 1.

As shown in FIGS. 1-2, an embodiment of a drilling jig 10 is depicted as being positioned so as to provide drilling guidance to drill holes through a component package comprised of an aircraft wing spar WS and wing rib WR. Although not shown, the drilling jig is positionally clamped to the component package by means of any suitable conventional clamping structures, e.g., F-, G- or C-clamps, spring clamps, screw clamps, hand clamps, locking clamps, quick action clamps and the like.

Figure 5:
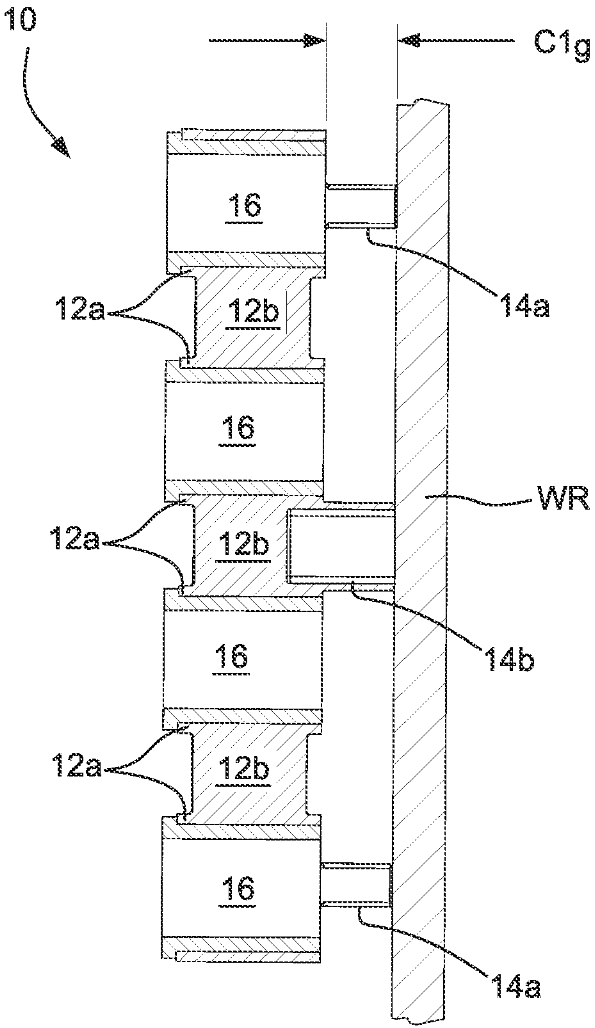
FIG. 5 is a cross-sectional elevational view of the drilling jig shown in FIG. 1 as taken along lines 5-5 therein.

The drilling jig 10 includes a jig body 12 having a series of cylindrical sockets 12*a* that are connected one to one another in a predetermined pattern by planar web members 12*b* oriented parallel to a substantially longitudinal bisecting plane of the sockets 12*a*. Pairs of tubular stand-off members 14*a* are unitarily joined to the endmost ones of the sockets 12*a* so as to be circumferentially spaced-apart around the exterior cylindrical surface of each of the endmost sockets 12*a*. The stand-off members 14*a* are of sufficient axial length so as to establish a clearance gap $C1_g$ between the bottom edge of the jig body 12 and the surface of the workpiece being drilled (which in the case of the embodiment shown in FIG. 1 is the wing spar WS) as is perhaps shown more clearly in FIG. 5. In order to impart greater stability to the jig body, an intermediate stand-off member 14*b* may optionally extend from an intermediate one of the web members 12*b*. The clearance gap $C1_g$ established by the stand-off members 14*a* and, if present the members 14*b*, will thereby allow metal shavings resulting from the drilling process to be removed from the drilling site so they do not accumulate in the jig 10 and possibly interfere with the drilling process.

Each of the cylindrical sockets 12*a* is sized and configured to receive therein a flanged cylindrical bushing 16. Each bushing 16 in turn defines a cylindrical guideway for a drill bit (not shown). Preferably, each bushing 16 is formed of a steel material that can withstand the rigors of the drilling process and protects the sockets 12*a* of the jig 10. The bushings 16 are preferably fixed within the respective socket 12*a*, e.g., by using a suitable metal bonding adhesive such as LOCTITE 638™ retaining compound.

The jig body 12, including the cylindrical sockets 12*a*, the web members 12*b*, the stand-off members 14*a*, and if present 14*b*, are preferably a one-piece additively manufactured structural unit. In this regard, the one-piece (unitary) jig body 12 may preferably be formed by an additive layer manufacturing (ALM) process, e.g., 3D printing, whereby powders of a suitable metal, e.g., aluminum alloy, may be "printed" using laser sintering according to a computer-aided design of the structural component being fabricated, e.g., as described more completely in U.S. Pat. Nos. 9,388,078 and 10,065,240 (the entire contents of each such prior issued patent being expressly incorporated hereinto by reference). As is known, a complete structural component can be designed with a 3D computer model which then aids the ALM process in a layer-by-layer additive manner. That is, a thin layer of metal alloy powder may be spread onto a supporting tray so as to then be laser-sintered based on a first slice of the computer-aided 3D model. Subsequent layers corresponding to successive slices of the 3D model will then be laser-sintered in a similar manner until the complete structural component is manufactured. Such an additively manufactured jig body 12 may thus take virtually any suitable geometric configuration so as to be optimally sized and configured for specific locations where aircraft structural components need to be drilled and then subsequently joined.

Figure 6:
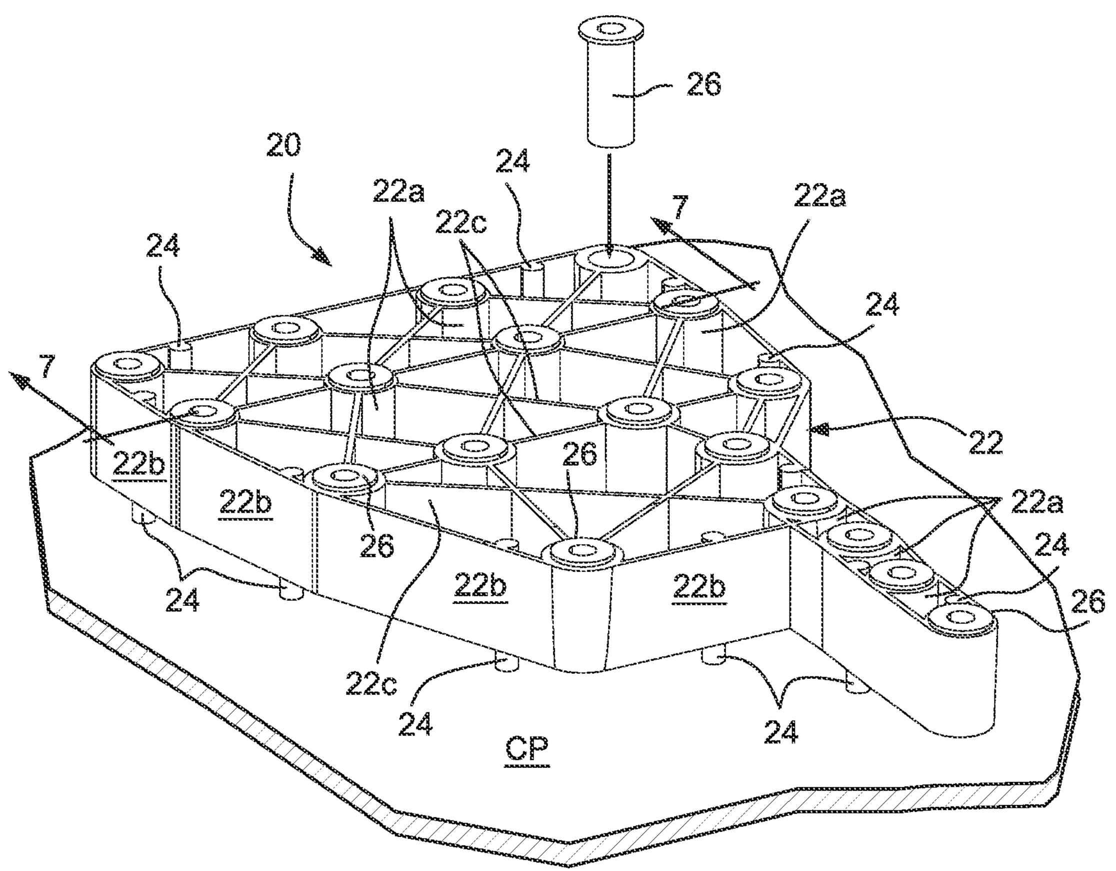
FIG. 6 is a perspective view of a drilling jig in accordance with another embodiment of the invention.
Figure 7:
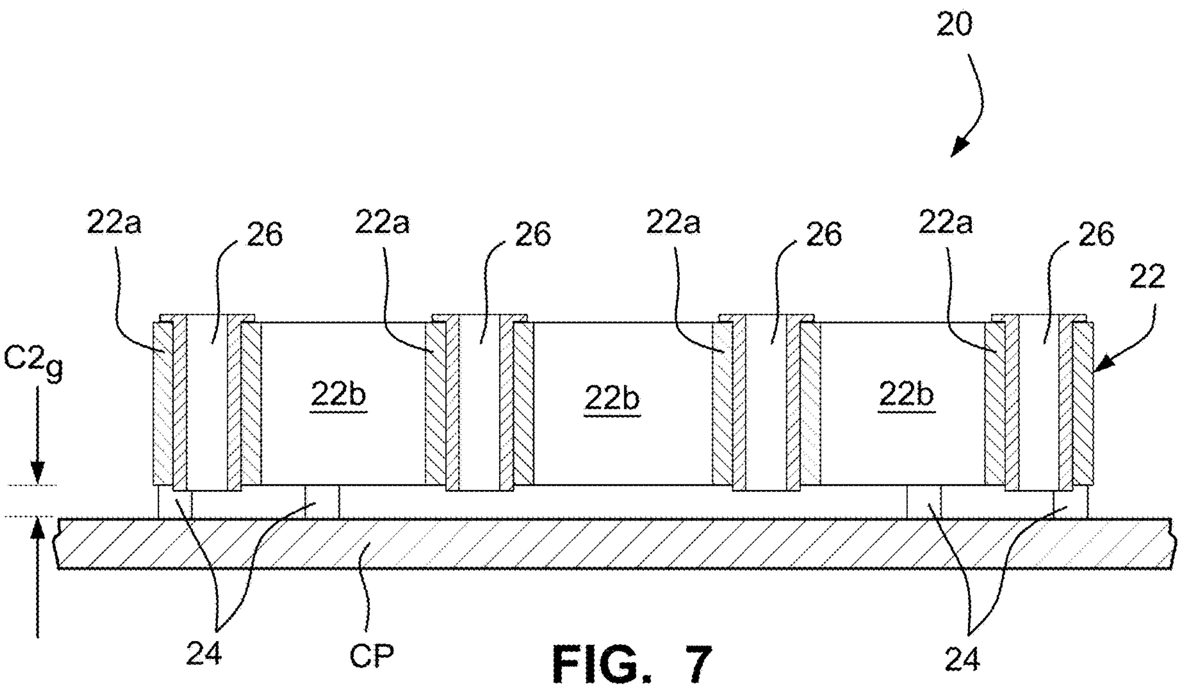
FIG. 7 is a cross-sectional elevational view of the drilling jig shown in FIG. 6 as taken along lines 7-7 therein.

Another embodiment of a drilling jig 20 is depicted in FIGS. 6 and 7 as having an additively manufactured jig body 22 which includes predetermined array of cylindrical sockets (a representative few of which are identified by reference numeral 22*a*). Outer ones of the cylindrical sockets 22*a* are joined together by interconnected perimetrical wall members 22*b* while inner ones of the cylindrical sockets 22*a* are interconnected by respective interior web members 22*c*. Cylindrical stand-off members 24 are unitarily joined to at least some of the perimetrical wall members 22*b* so as to be spaced apart about the exterior periphery of the jig 20. The stand-off members 24 are of sufficient axial length so as to establish a clearance gap C2*g* between the bottom edge of the jig body 22 and the surface of the workpiece or component part CP being drilled as is perhaps shown more clearly in FIG. 7. The clearance gap C2*g* established by the stand-off members 24 will thereby allow metal shavings resulting from the drilling process to be removed from the drilling site so they do not accumulate in the jig 20 and possibly interfere with the drilling process.

Each of the cylindrical sockets 22*a* is sized and configured to receive therein a flanged cylindrical bushing 26. Each bushing 26 in turn defines a cylindrical guideway for a drill bit (not shown). Preferably, each bushing 26 is formed of a steel material that can withstand the rigors of the drilling process and protects the sockets 22*a* of the jig 10. The bushings 26 are preferably fixed within the respective socket 12*a*, e.g., by using a suitable metal bonding adhesive.

As should now be appreciated, the drilling jig embodiments described herein provide for the jig geometry to be optimized and/or customized to allow for the jig to be spatially adapted for use in virtually any situation in which component parts need to be accurately drilled and thereafter joined together.

Therefore, while reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A drilling jig comprising:

(i) a one-piece jig body which includes:
  a plurality of cylindrical sockets that are spatially separated from one another; and
  a web member joining the plurality of cylindrical sockets to one another to form a conjoined set of cylindrical sockets having an opposed set of endmost cylindrical sockets;

(ii) a plurality of cylindrical bushings, wherein each of the cylindrical bushings is received within a respective one of the cylindrical sockets and defines a cylindrical guideway for a drill bit; and (iii) pairs of axially elongated end stand-off members attached to respective exterior cylindrical surfaces of each of the endmost cylindrical sockets so that the end stand-off members are circumferentially separated from one another about the exterior cylindrical surfaces of the endmost cylindrical sockets, wherein each of the elongated end stand-off members is of sufficient axial length so as to establish a clearance gap between a bottom edge of the jig body and a surface of a part to be drilled.

2. The drilling jig according to claim 1, wherein the plurality of cylindrical sockets includes an adjacent pair of inner cylindrical sockets between the endmost cylindrical sockets, and wherein the web member includes an intermediate web member joining the adjacent pair of inner cylindrical sockets to one another, and wherein the intermediate web member includes an axially elongated intermediate stand-off member extending from a bottom edge of the intermediate web member and being of sufficient axial length so as to establish a clearance gap between a bottom edge of the intermediate web member and the surface of the part to be drilled.

3. The drilling jig according to claim 2, wherein the stand-off members are either solid or hollow.

4. The drilling jig according to claim 1, wherein the jig body is a one-piece additively manufactured structural unit.

5. The drilling jig according to claim 4, wherein the jig body is formed of an additively laser sintered metallic powder.

6. The drilling jig according to claim 5, wherein the metallic powder comprises an aluminum alloy powder.

7. The drilling jig according to claim 1, wherein the web member is planar, and wherein the planar web member is oriented parallel to a substantially longitudinal bisecting plane of each of the cylindrical sockets.

8. The drilling jig according to claim 7, wherein the jig body is a one-piece additively manufactured structural unit.

9. The drilling jig according to claim 8, wherein the jig body is formed of an additively laser sintered metallic powder.

10. The drilling jig according to claim 9, wherein the metallic powder comprises an aluminum alloy powder.

11. The drilling jig according to claim 1, wherein each of the cylindrical bushings includes a flange.

12. The drilling jig according to claim 1, wherein each of the cylindrical bushings is adhesively joined to the respective one of the cylindrical sockets.

13. A method of fabricating the drilling jig according to claim 1, comprising the steps of:

(a) additively sintering layers of a metallic powder to form the one-piece jig body which includes the plurality of cylindrical sockets that are spatially separated from one another, and the web member joining the plurality of cylindrical sockets; and thereafter (b) inserting the cylindrical bushings defining respective cylindrical guideways into respective ones of the cylindrical sockets.

14. The method according to claim 13, wherein the metallic powder comprises an aluminum alloy.

15. The method according to claim 13, wherein step (b) comprises adhesively joining the cylindrical bushings to the respective ones of the cylindrical sockets.

16. The method according to claim 13, wherein step (a) is conducted by 3D laser-sintering of the metallic powder.

17. A method of drilling apertures in a workpiece comprising:

(a) positioning the drilling jig according to claim 1 relative to a surface of the workpiece so as to align the cylindrical guideways of the bushings with respective locations on the surface of the workpiece where apertures are to be drilled, and thereafter (b) operating a drill bit within the cylindrical guideways to drill the apertures through the workpiece.

18. The method according to claim 17, wherein step (b) comprises allowing shavings of removed material from the workpiece to be removed from the respective locations through the clearance gap established by the elongated end stand-off members.

* * * * *